United States Patent Office 3,846,313
Patented Nov. 5, 1974

3,846,313
LUBRICANT COMPOSITION CONTAINING
DISPERSED ALKALI METAL BORATE
Marc J. Sims, San Francisco, Calif., assignor to Chevron Research Company, San Francisco, Calif.
No Drawing. Filed Aug. 31, 1972, Ser. No. 285,158
Int. Cl. C10m 1/10
U.S. Cl. 252—18                    17 Claims

ABSTRACT OF THE DISCLOSURE

A novel lubricant composition is disclosed, having superior EP and water tolerance properties, which comprises a lubricating oil and minor amounts each of sodium borate, a lipophilic surface-active agent or a lipophilic dispersant mixture, and a fatty alcohol.

BACKGROUND OF THE INVENTION

Field of the Invention

This invention relates to extreme pressure (EP) lubricating oils having good limited slip activity.

High load conditions often occur in the gear sets used in automotive transmission differentials and similar devices as well as in many types of bearings. In order to avoid the undesirable effects which result when using an uncompounded oil under these high load conditions, the lubricants for use in such service contain "EP agents." For the most part EP agents have been oil soluble or easily incorporated as a stable dispersion in the oil. Most of the prior art EP agents are chemically reactive; they contain chlorine, sulfur, or phosphorus. These react with the metal surfaces of the gears or bearings at the high temperatures produced under high load.

In addition to extreme pressure properties, lubricants for limited slip differentials require unusual frictional properties. Limited slip differentials are unlike conventional differentials in that they have the ability to move a vehicle when only one wheel has traction. This advantage is accomplished through an internal clutch that restricts conventional differential action and tends to make the left and right rear axle shafts turn as one. There are a variety of clutch arrangements employed to accomplish this result, but most rely on the force of friction to restrict the free-turning of the axle shafts. Since the clutches are continuously contacted by the differential lubricant, the restricting force depends on the coefficient of friction imparted to the engaging parts by the lubricant. The coefficient of friction must be compromised. On the one hand, it must be high enough to allow the clutch plates to seize, thus allowing the vehicle to move in instances when one rear wheel has low traction, and, on the other hand, it must be sufficiently low to allow the clutch plates to slip and accommodate conventional differential action such as occurs when the vehicle turns corners. The ability of a lubricant to impart a coefficient of friction within this fairly wide effective range is referred to as effectiveness.

Another important aspect of frictional properties relates to the chatter or noise caused by the differential action of the clutches. Chatter is generated by a stick-slip action of the engaging parts of the clutches. Differential manufacturers have found that stick-slip is primarily a result of the static coefficient of friction ($\mu_S$) being greater than the dynamic coefficient of friction ($\mu_D$); that is, when the friction ratio $\mu_S/\mu_D$ is greater than 1. Therefore, a lubricant that possesses anti-chatter ability has a friction ratio of less than 1.

Recently Peeler in U.S. Pat. No. 3,313,727 disclosed an EP lubricant produced by the dispersion in a nonpolar lubricating oil of a hydrated alkali metal borate. The borate, water and an emulsifier were introduced into the nonpolar medium. The mixture was then agitated to produce the dispersion of the water in the oil and heated to dehydrate the alkali metal borate. Peeler also disclosed that conventional additives such as rust inhibitors, detergents, foam inhibitors, etc., could be present in the finished lubricating composition containing the borate.

The borate-containing oils described by Peeler do not possess the desired limited slip performance properties. When tested in a limited-slip differential, the borate containing oils caused chatter. In a separate friction measuring test, the friction ratio $\mu_S/\mu_D$ was found to be greater than 1. Thus, a need exists for a borate-containing lubricating oil which has the desired limited slip activity, which is easily prepared and which meets other performance requirements such as anti-wear properties, etc.

It is an object of this invention to provide an improved lubricating composition.

It is an additional object of this invention to produce a lubricating composition having good extreme pressure properties and exhibiting good limited slip activity.

It is another object of this invention to provide a borate-containing lubricant having a static to dynamic coefficient of friction ratio below 1.

It is another object of this invention to provide an improved method for lubricating a limited slip differential.

Other additional objects will become apparent from the following description of the invention and accompanying claims.

SUMMARY OF THE INVENTION

The above-mentioned objects and their attendant advantages can be realized with a novel lubricant composition comprising an oil of lubricating viscosity having dispersed therein from 1 to 60 weight percent based on the weight of the entire composition of a particulate hydrated alkali metal borate and from 0.3 to 2 weight percent of a $C_{12}$ to $C_{20}$ aliphatic hydrocarbon alcohol. These compositions exhibit the high degree of anti-wear and extreme pressure properties as possessed by the compositions described in U.S. Pat. No. 3,313,727 and additionally exhibit the necessary limited slip activity for use in limited slip axle differentials. The static to dynamic coefficient of friction ratio for these compositions is below 1 and is usually between about 0.7 and 0.98.

The exact mechanism of the novel combination is not known. It is known, however, that a synergism between the two exists to effect the remarkable limited slip properties since the borate-containing lube and the alcohol-containing lube when tested individually, both exhibit a friction ratio above 1 and, accordingly, fail to possess the desired limited slip activity.

DETAILED DESCRIPTION OF THE INVENTION

The compositions of this invention are highly stable lubricants and perform well in EP tests such as the four-ball test. There is no substantial interreaction between the borate addition and the alcohol. They are useful in a number of gear and bearing lubrication applications, particularly as automotive differential lubricants. In contrast to most other EP lubricants, they are essentially noncorrosive to the metal surfaces of the gears.

The composition of this invention is a lubricant having improved extreme pressure and limited slip properties which comprises (A) 10 to 98 parts by weight of an oil of lubricating viscosity; (B) 2 to 25 parts by weight of amorphous particles having a size less than 1 micron of a hydrated alkali metal borate of the formula $$xM_2O \cdot B_2O_3 \cdot yH_2O$$

wherein $x$ is a number of from 0.25 to 1.5 and $y$ is a number of up to 5.0, usually from 0.5 to 5.0 and M an alkali metal such as potassium and sodium and preferably sodium; (C) a lipophilic or a dispersant mixture of a lipophilic anionic agent containing a Group II metal and sulfur and a lipophilic nonionic surface active agent in an amount of about 0.05 to 0.5 part by weight per part by weight of the borate; and (D) about 0.3 to 3.0 weight percent of a monohydroxy fatty alcohol having from 12 to 20 carbons.

The Hydrated Borate

The principal hydrated borates of this lubricant composition are hydrated alkali metal borates of the formula $$xM_2O \cdot B_2O_3 \cdot yH_2O$$

wherein $x$ represents a number of from 0.25 to 1.5 and $y$ represents a number of up to 5.0, usually from 0.5 to 5.0. These include sodium metaborate, potassium metaborate, lithium metaborate, sodium tetraborate, borax and similar materials, as well as mixtures of two or more sodium borate compounds. The preferred alkali metal borate is a sodium borate. Preferably, $x$ will represent a number of from 0.5 to 1.5 and $y$ will represent a number $(1.0–3.0)x$; i.e., one to three times $x$. For practical reasons, the minimum amount of water of hydration will be about 0.01 mol per mol of $B_2O_3$. It is possible to obtain an anhydrous alkali metal borate, but it requires an unnecessarily large degree of processing to do so. Further, exposure of the anhydrous material to ambient air will result in the natural accumulation of some water of hydration.

In one embodiment, there will be a mixture containing at least one sodium borate and one borate of another alkali metal, preferably potassium. These compositions can be represented by the following formula $$xNa_2O \cdot zM_2O \cdot B_2O_3 \cdot yH_2O$$

wherein $z$ represents a number greater than 0 and up to 0.5 and x and y are as noted above. M represents an alkali metal other than sodium. It is usually one of the lighter alkali metals, i.e., lithium or potassium; preferably, potassium. The coefficient $z$ preferably represents 0.25 to 0.50, and is usually $(0.5–1.5)x$.

(The above formulae are meant to be empirical and not structural. The exact structure in which the borate exists in composition is unknown and varies with different amounts of water of hydration. Numerical values for quantities such as percentage contents will, therefore, be based on the empirical formulae. Where a mixture of sodium and other alkali metal borates is involved, references to "borate" as a basis for such parameters as content of other components will mean the total borate mixture.)

The borate will be dispersed as particles throughout the lubricating oil medium by means of an emulsifying agent described below. The borate particles are glass-like and are essentially entirely all less than 1 micron in diameter and for the most part less than 0.5 micron in diameter.

The amount of borate present will depend on the weight percent desired in the final lubricant composition. This will generally be from about 2 to 25 parts by weight (including any water of hydration) of borate and more usually from about 5 to 15 parts by weight, for each 75 to 100 parts per weight of lubricating oil. In a concentrate the borate content will generally vary from 25 to 60 weight percent and preferably from 30 to 50 weight percent of the concentrate.

The water present during dispersion of the borate will be sufficient to dissolve the anhydrous borate but should not be in such excess as to make later dehydration difficult. Generally from about 0.5 to 3 parts by weight of water will be used per part of weight of anhydrous borate and more usually from about 0.5 to 1.5 parts per part of anhydrous borate.

The Alcohol

The alcohol component of this lubricant can comprise any $C_{12}–C_{20}$ and preferably $C_6–C_{20}$ monohydroxy aliphatic alcohol. The alcohol may be saturated or unsaturated. The preferred alcohols are ethylenically unsaturated, having from 1 to 5 olefinic double bonds. The olefinic double bonds may be conjugated or nonconjugated, however, nonconjugated double bonds are preferred and a single olefinic double bond is more preferred.

Typical examples of suitable alcohols which may be employed in the parctice of this invention include hexadecanol, octadecanol, lauryl alcohol, myristyl alcohol, palmityl alcohol, stearyl alcohol, oleyl alcohol, linoleyl alcohol, arachidonyl alcohol, palmitoleyl alcohol, petroselinyl alcohol, vaccenyl alcohol, etc. The preferred alcohols are octadecanol, palmityl alcohol, oleyl alcohol and linoleyl alcohol and most preferably oleyl alcohol.

The amount of alcohol present will vary depending upon the exact properties desired, they type of alcohol selected, etc. Generally, however, the alcohol will be present in an amount from 0.3 to 2 weight percent of the lubricating oil and preferably from 0.3 to 1 weight percent. The ratio of alcohol to borate will generally vary from 0.05 to 0.75 part of alcohol per part of borate and preferably from 0.06 to 0.2 part per part of borate.

In concentrates, the alcohol concentration will normally vary from 3 to 10 weight percent of the concentrate.

For convenience in processing, the borates are usually incorporated into the lubricating oil as concentrates having 50 to 60 weight percent hydrated borate (as described in the Peeler patent).

The Lubricating Oil Medium

The lubricating oil can be any fluid of lubricating viscosity which is inert under the reaction conditions (particularly nonsaponifiable). Fluids of lubricating viscosity generally have viscosities of 35 to 50,000 Saybolt Universal Seconds (SUS) at 100° F. The fluid medium or oil may be derived from either natural or synthetic sources. Included among the natural hydrocarbonaceous oils are paraffin-base, naphthenic-base or mixed-base oils. Synthetic oils include polymers of various olefins, generally of from 2 to 6 carbon atoms, alkylated aromatic hydrocarbons, etc. Nonhydrocarbon oils include polyalkylene oxide, e.g., polyethylene oxide, aromatic ethers, silicones, etc. The preferred media are the hydrocarbonaceous media, both natural and synthetic. Preferred are those hydrocarbonaceous oils having SAE viscosity numbers of 5W to 20W and 20 to 250 (see Guthrie, pages 9–13) and particularly those having SAE viscosity numbers in the range 75 to 250.

The lubricating oil will be present at 75 to 100 parts by weight of the final lubricant composition. In the concentrate, however, the oil may be present as 10 to 75 parts by weight. These concentrates are diluted with additional oil prior to being placed in service to obtain the requisite concentration.

The Lipophilic Surface-Active Agent

A wide variety of emulsifying agents or dispersants may be used. Particularly useful are those dispersants which find use as detergents in lubricating oils. These dispersants are exhaustively described in the aforesaid U.S. Pat. No. 2,987,476, which disclosure is incorporated herein by reference. No attempt will be made to repeat all that is said in that patent; only the highlights of the discussion will be repeated here.

The above-cited patent describes the materials as lipophilic ionic surface-active agents. However, since in this invention, nonionic dispersants may be used, such as alkenyl succinimides of alkylene amines, disclosed in U.S. Pats. Nos. 3,024,195, 3,018,291, and 3,131,150, and addition polymers of esters and amides, e.g., copolymers of acrylates and vinyl pyrrolidone, the dispersants will be referred to as lipophilic surface-active agents, which, as referred to herein, is a term synonymous with "hydrophobic," which means a compound substantially insoluble in and immiscible with water, and which is readily soluble in organic liquids having electric dipole moments of 0.5 Debye unit or less.

The group of emulsifying agents may be broken down into two major classes, ionic emulsifying agents and neutral or nonionic emulsifying agents. Exemplifying the ionic materials are the metal salts of oil-soluble acidic organic compounds, e.g., sulfonates, carboxylates, phenolates. Quaternary ammonium salts are also included. Exemplifying the nonionic surface-active agents are the alkenyl succinimides, aliphatic amine amides of maleic anhydride hydrocarbon polymers and addition copolymers of acrylates and amides.

Of particular interest among the lipophilic ionic surface-active agents are the carboxylates, phenates and sulfonates of alkaline earth metals, e.g., calcium, magnesium and barium. The hydrocarbon chain bonded to the acidic group, i.e., carboxyl, phenolic hydroxyl or sulfonyl, is generally of at least 8 carbon atoms and more usually of from 10 to 26 carbon atoms. The group attached to the acidic functionality may be aliphatic, alicyclic or aromatic or combinations thereof, e.g., aralkyl and will be defined as hydrocarbyl.

Illustrative of the nonionic surface-active agent are alkenyl succinimides of alkylene amines, having an alkenyl group of from 30 to 200 carbon atoms and an alkylene amine of from 2 to 10 carbon atoms and from 1 to 6 nitrogen atoms; copolymers of polymethacrylate or polyacrylate with vinyl pyrrolidone, acrylamide or methacrylamide; or, amides of maleic anhydride modified polymers of hydrocarbons such as ethylene, octene, dodecene, octadecene, and the like. Generally, the lipophilic nonionic dispersants will have an HLB factor below about 10 and preferably below 9.

The effectiveness of the borate compositions of this invention varies with the particular dispersant. Preferred dispersants are the oil-soluble polyvalent metal sulfonates, particularly alkaline earth metal sulfonates, e.g., calcium and barium, wherein the hydrocarbyl group bonded to the sulfur is of from 8 to 26 carbon atoms, more usually of from 10 to 22 carbon atoms. The radical bonded to the sulfur may be alicyclic as in naphthenyl sulfonic acid, alkaryl as in octylphenyl sulfonic acid, or alkyl as in cetyl sulfonic acid. The metals may be calcium, magnesium, barium, and the like.

The amount of dispersant required will vary with the particular dispersant used, and the total amount of borate in the medium. About 0.05 to 0.5, more usually about 0.1 to 0.3 part by weight of dispersant will be used per part of total borate. Generally, the upper ranges of the dispersant content will be used with the upper ranges of the borate content.

Dispersant Mixture

The preferred lubricant composition of this invention contains a mixture of a lipophilic anionic surface-active agent containing a Group II metal and sulfur and a lipophilic nonionic surface-active agent.

The concentrations of the anionic dispersant and the nonionic dispersant in the mixture will be in the range of 40 to 99.9 weight percent anionic dispersant and 60 to 0.1 weight percent nonionic dispersant. Preferably, there will be 50 to 95 weight percent anionic dispersant and 50 to 5 weight percent nonionic dispersant. The weight ratio of anionic dispersant to nonionic dispersant will usually be in the range of 6–1:1, preferably 4–1:1.

The lipophilic anionic surface-active agent will be a compound or mixture of compounds each containing a Group II metal and sulfur. A number of these are described in the aforesaid U.S. Pat. 3,313,727 and 2,987,476. Particularly preferred are the metal salts of oil-soluble sulfur-containing carbocyclic compounds, including those containing a benzenoid structure and those containing a cycloaliphatic structure. These include the salts of the carbocyclic sulfur acids.

The salts of these acids will be salts of the metals conventionally referred to as Group II metals, i.e., the alkaline earth metals, and usually those of magnesium, strontium, calcium and barium, particularly calcium and magnesium. These salts may be prepared by directly reacting the acid with a Group II metal base or a Group II metal salt. Alternatively, the salt may be prepared by first forming a Group I metal salt of the acid, by neutralizing the acid with a Group I metal base and then converting the Group I metal salt to the Group II metal salt by the metathetical reaction of the Group I metal salt with Group II metal salt or base. Methods for preparing the Group II metal salts by all of these methods are well known in the art.

The oil-soluble carbocyclic sulfur acids whose salts are used herein include the carbocyclic sulfonic acids, sulfamic acids, sulfinic acids, thiosulfonic acids, and the like. These acids can be either cycloaliphatic or alkyl substituted aromatic configuration.

A particularly desirable group of oil-soluble salts of carbocyclic sulfur acids comprises the salts of sulfonic acids of various types including cycloaliphatic, hydroaromatic, aromatic (including both benzene sulfonic acids and naphthalene sulfonic acids) and heterocyclic acids and acids of mixed types. Examples of salts of suitable acids include the salts of sulfonic acids such as benzene sulfonic acids, toluene sulfonic acids, naphthalene sulfonic acids, triisopropyl naphthalene sulfonic acids, polyamyl naphthalene sulfonic acids, diphenyl sulfonic acids, and the like. Salts of sulfonic acids of aromatic hydrocarbon substituted by a higher alkyl group or groups and in which the alkyl substituent group or groups contain a total of at least about 8, preferably not more than about 22, carbon atoms are of particular interest. Salts of sulfonic acids of phenols which can be monocyclic as well as polycyclic, monohydric as well as polyhydric, and which preferably also contain alkyl and/or aryl substituent groups are also suitable. Examples of this class of salts include the oil-soluble salts of cresol sulfonic acids, xylenol sulfonic acid, naphthol sulfonic acids, catechol sulfonic acids and the like. Salts of sulfonic acids of completely or partly hydrogenated aromatic compounds, for example, tetrahydronaphthalene sulfonic acid, are also suitable.

Particularly preferred, however, because of their wide availability, are salts of the petroleum sulfonic acids, particularly the petroleum sulfonic acids which are obtained by sulfonating various hydrocarbon fractions, such as lubricating oil fractions and extracts rich in aromatics which are obtained by extracting a hydrocarbon oil with a selective solvent, which extracts may, if desired, be alkylated before sulfonation by reacting them with olefins or alkyl chlorides by means of an alkylation catalyst; organic polysulfonic acids such as benzene disulfonic acid, which may or may not be alkylated; and the like. The preferred salts for use in the present invention are those of alkylated aromatic sulfonic acids in which the alkyl radical(s) contain at least about 8 carbon atoms, for example, from about 8 to about 22 carbon atoms. Exemplary members of this preferred group of sulfonate starting materials are the aliphatic-substituted cyclic sulfonic acids in which the aliphatic substituent(s) contain a total of at least 12 carbon atoms, such as the alkyl aryl sulfonic acids, alkyl cycloaliphatic sulfonic acids and alkylheterocyclic sulfonic acids, and aliphatic sulfonic acids in which the aliphatic radial(s) contain a total of at least 12 carbon atoms. Specific examples of these oil-soluble sulfonic acids include: petroleum sulfonic acids, petrolatum sulfonic acids, mono- and polywax-substituted naphthalene sulfonic acids, substituted sulfonic acids, such as cetyl-chlorobenzene sulfonic acids, cetylphenol sulfonic acids, and the like, aliphatic sulfonic acids, such as paraffin wax sulfonic acids, unsaturated paraffin wax sulfonic acids, hydroxy-substituted paraffin wax sulfonic acids, etc.; cyclo-aliphatic sulfonic acids, such as petroleum naphthalene sulfonic acids, cetyl-cyclopentyl sulfonic acids, mono- and polywax-substituted cyclohexyl sulfonic acids and the like.

The term "petroleum sulfonic acids" is intended to cover all sulfonic acids which are derived directly from petroleum products.

Typical Group II metal sulfonates suitable in this composition include the metal sulfonates exemplified as follows: calcium white oil benzene sulfonate, barium white oil benzene sulfonate, magnesium white oil benzene sulfonate, calcium dipolypropene benzene sulfonate, barium dipolypropene benzene sulfonate, magnesium dipolypropene benzene sulfonate, calcium mahogany petroleum sulfonate, barium mahogany petroleum sulfonate, magnesium mahogany petroleum sulfonate, calcium triacontyl sulfonate, magnesium triacontyl sulfonate, calcium lauryl sulfonate, barium lauryl sulfonate, magnesium lauryl sulfonate, etc.

The lipophilic nonionic surface-active agents include those generally referred to as "ashless detergents." Preferably, the nonionic surfactants have an HLB factor (hydrophilic-lipophilic balance) below about 7 and preferably below about 5.

A principal class of lipophilic nonionic surface-active agents is the N-substituted alkenyl succinimides, derived from alkenyl succinic acid or anhydride and alkylene polyamines. These compounds are generally considered to have the formula

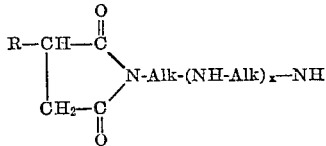

wherein R is a hydrocarbon radical having a molecular weight from about 400 to about 3000 (that is, R is a hydrocarbon radical containing about 30 to about 200 carbon atoms), Alk is an alkylene radical of from 2 to 10, preferably 2 to 6, carbon atoms, and $x$ is a number of from 0 to 6, preferably 0 to 3. (The actual reaction product of alkenyl succinic acid or anhydride and alkylene polyamine will comprise a mixture of compounds, including succinamic acids and succinimides. However, it is customary to designate this reaction product as "succinimide" of the described formula, since that will be a principal component of the mixture. See U.S. Pats. 3,202,678; 3,024,237; and 3,172,892.)

These N-substituted alkenyl succinimides can be prepared by reacting maleic anhydride with an olefinic hydrocarbon, followed by reacting the resulting alkenyl succcinic anhydride with the alkylene polyamine. The "R" radical of the above formula, that is, the alkenyl radical, is derived from an olefin containing from 2 to 5 carbon atoms. Thus, the alkenyl radical is obtained by polymerizing an olefin containing from 2 to 5 carbon atoms to form a hydrocarbon having a molecular weight ranging from about 400 to 3000. Such olefins are exemplified by ethylene, propylene, 1-butene, 2-butene, isobutene, and mixtures thereof. Since the methods of polymerizing the olefins to form polymers thereof is immaterial in the formation of the new compound described herein, any of the numerous processes available can be used therefor.

The alkylene amines used to prepare the succinimides are of the formula

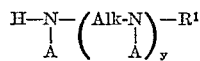

wherein $y$ is an integer of from 1 to 10, preferably 1–6, A and $R^1$ are each a substantially hydrocarbon or hydrogen radical, and the alkylene radical Alk is preferably a lower alkylene radical having less than about 8 carbon atoms. The alkylene amines include principally methylene amines, ethylene amines, butylene amines, propylene amines, pentylene amines, hexylene amines, heptylene amines, octylene amines, other polymethylene amines, and also the cyclic and the higher homologs of such amines such as piperazines and amino-alkyl-substituted piperazines. They are exemplified specifically by: ethylene diamine, triethylene tetramine, propylene diamines, decamethylene diamine, octamethylene diamine, di(heptamethylene) triamine, tripropylene tetramine, tetraethylene pentamine, trimethylene diamine, pentaethylene hexamine, di(trimethylene)triamine, 2-heptyl 3-(2-aminopropyl)imidazoline, 4-methyl-imidazoline, 1,3-bis-(2-aminoethyl)imidazoline, pyrimidine, 1-(2-aminopropyl)piperazine, 1-4-bis(2-aminoethyl) piperazine, and 2-methyl-1-(2-aminobutyl)-piperazine. Higher homologs such as are obtained by condensing two or more of the above illustrated alkylene amines likewise are useful.

The ethylene amines are especially useful. They are described in some detail under the heading "Ethylene Amines" in Encyclopedia of Chemical Technology, Kirk and Othmer, Vol. 5, pages 898–905, (Interscience Publishers, New York: 1950).

The term "ethylene amine" is used in a generic sense to denote a class of polyamines conforming for the most part of the structure

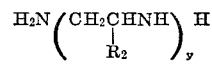

in which $R^2$ is a lower alkyl radical of from 1–4 carbon atoms or hydrogen and $y$ is as defined above. Thus it includes, for example, ethylene diamine, diethylene triamine, triethylene tetramine, tetraethylene pentamine, pentaethylene hexamine, 1,2-diaminopropane, N,N-di(1-methyl-2-aminomethyl)amine, etc.

A second group of important nonionic dispersants comprises certain pentaerythritol derivatives. Particular derivatives which find use in this invention are those in which pentaerythritol is combined with a polyolefin and maleic anhydride or with a polyolefin and a phosphorus sulfide. The polyolefins are the polymers of monomeric olefins having 2 to 6 carbon atoms, such as polyethylene, polypropylene, polybutene, polyisobutylene and the like. Such olefins generally contain a total of 20 to 250 carbon atoms and preferably 30 to 150 carbon atoms. The phosphorus sulfides include $P_2S_3$, $P_2S_5$, $P_4S_7$, $P_4S_3$ and related materials. Of these, $P_2S_5$ (phosphorus pentasulfide) is preferred principally because of its ready availability.

Other nonionic emulsifiers which may be used include polymethacrylates and copolymers of polymethacrylate or polyacrylate with vinyl pyrrolidone, acrylimide or methacrylimide.

The mixture of dispersants of lipophilic surface-active agents will generally be present in from about 0.25 to 5 weight percent, more usually from about 0.5 to 3 weight percent, of the composition. The actual amount of emulsifier mixture required will vary with the particular mixture used and the total amount of borate in the oil. Generally about 0.05 to 0.5, more usually about 0.1 to 0.3, part by weight of mixture will be used per part by weight of the borate. (In the concentrates the mixture concentration will be based on the relationship to borate rather than on the fixed percentage limits of the lubricant, noted above.) Generally the upper ranges of the mixture concentration will be used with the upper ranges of the sodium borate concentration.

Preparation of the Lubricating Composition

The novel compositions of this invention are prepared by dehydrating a water and oil emulsion of an aqueous solution of borate to provide the desired dispersion of the hydrated borate in the oil medium and then incorporating the alcohol component into the borate dispersion. This process is carried out by introducing into the inert nonpolar lubricating oil medium the alkali metal borate, and, if desired, at least one other alkali metal borate, water, and the desired emulsifier, and then vigorously agitating the mixture to provide a microemulsion of the water in the oil. The mixture is then heated at a temperature and for a time which provides the desired degree of hydration of the borate. Ordinarily, the oil and dispersing agent will be blended and heated first, and then a hot solution of borate added during agitation. Once the borate is dispersed and the solution dehydrated to the desired degree, the alcohol is added with vigorous stirring until a homogeneous composition is obtained.

The temperature at which the emulsion is dehydrated will generally be at least 250° F., more usually at least 300° F. Lower temperatures may be used at reduced pressures. However, the process is most conveniently carried out at atmospheric pressures.

The time of reaction will depend on the degree of dehydration desired, the amount of water present, and the temperature. Time is not critical and will be determined for the most part by the variables mentioned.

Other materials may also be present in the composition of this invention. Materials may be added for enhancing the emulsifying effect of the emulsifier, enhancing some of the properties which are imparted to the lubricating medium by the borates, or providing other desirable properties to the lubricating medium. These include such additives as rust inhibitors, antioxidants, detergents, foam inhibitors, viscosity index improvers, pour point depressants, etc. Usually these will be in the range of from about 0.1 to 5 weight percent, more usually in the range of from about 0.1 to 2 weight percent, of the total composition.

The following examples are presented to illustrate the practice of specific embodiments of this invention and should not be interpreted as limitations upon the scope of its invention.

EXAMPLE 1

This example is presented to illustrate the preparation of the alkali metal borate-containing lubricant. Approximately 100 grams of a hydrocarbon neutral oil having a viscosity of 126 SUS at 100° F. are charged into a 1000 milliliter Waring Blender along with 33 grams of an emulsifier comprising a neutral calcium petroleum sulfonate (containing 1.67 weight percent calcium) and 11 grams of alkenyl succinimide nonionic dispersant. The contents of the blender are mixed and heated to a temperature of 200° F. An aqueous solution of sodium borate and water are heated to the same temperature and added to the contents of the Blender under agitation. The contents are stirred under strong agitation (maximum speed of the blender) and heated under dehydrating conditions to a temperature of 300° F. After dehydration, the water content of the concentrate is approximately 1 mol of water per mol of anhydrous borate. The borate concentration in the concentrate is approximately 50 weight percent based on the total borate.

EXAMPLE 2

This example is presented to illustrate the compatability of the borate-alcohol additive combination of the invention as compared to nonalcoholic additives having a similar number of carbon atoms. In the compatibility tests, a 15 milliliter sample of the borate concentrate as prepared by Example 1, diluted with 9 parts of an oil (SAE 90) per part of the concentrate, is admixed with 0.2 to 1 weight percent of the additive. The mixture is maintained at 300° F. for a period of 18 hours and thereafter visually observed. The amount of precipitate formed is observed and reported in the following Table I for several additives.

TABLE I.—ADDITIVE COMPATIBILITY

| Additive | Precipitate | Compatible |
|---|---|---|
| Octadecylamide | Heavy | No. |
| Oleyoyl sarcosine | do | No. |
| Oleyl alcohol | None | Yes. |
| Octadecanol | do | Yes. |
| Octanoic acid | Heavy | No. |

As illustrated by the above table, the selection of the type of functional group on the long chain fatty radical is an important aspect of this invention with the monohydroxy alcohols being the only compatible additive of the above tested.

EXAMPLE 3

This example is presented to illustrate the extreme pressure properties of the compositions of this invention. In these tests a lubricant is prepared containing 10 weight percent of the borate concentrate as prepared by the method of Example 1, and about 90 weight percent of an SAE 90 hydrocarbon gear lubricant composed of approximately equal parts of a neutral oil having a viscosity of 41 SUS at 210° F. and a bright stock having a viscosity of 185 SUS at 210° F. Small amounts of a poly-(alkylmethacrylate) pour point depressant and a silicone foam inhibitor are added. Varying amounts of a test additive described below are also admixed with the above mixture. The final hydrated borate concentration in the test composition is weight percent, the total dispersant content is 1.6 weight percent and the test additive concentration varies as reported below in Table II.

The test compositions are subjected to a standard EP test referred to as the "four-ball test" which is described in Boner, *Gear and Transmission Lubricants*, (Reinhold Publishing Co.), 1964, pp. 222–223. In this test, three ½″ diameter steel balls are clamped together and immersed in the test lubricant. A fourth ball is then rotated at 1,750 r.p.m. in contact with the other three balls. A 50 kg. load is applied to the rotating ball forcing the same against the three stationary balls. The test is run for 30 minutes, and at the end of the run, the three stationary balls are observed for wear scars. The average scar size in millimeters is reported. The size of the scar is indicative of the extreme pressure character of the lubricant with a smaller scar representing a superior extreme pressure lubricant. Lubricants giving an average wear scar of less than 0.4 is considered to have excellent EP properties. The following Table II reports the results from the above four-ball test with various test lubricants.

TABLE II.—FOUR-BALL TEST

| Test lubricant | Type | Conc. (wt. percent) | Type | Conc. (wt. percent) | Scar diameter (mm.) |
|---|---|---|---|---|---|
| 1 | Hydrated sodium borate | 5 | Iso-oleyl amine | 1 | 0.5 |
| 2 | do | 5 | Ethoxylated oleylamine | 1 | 1.0 |
| 3 | do | 5 | Cetyl alcohol | 0.5 | 0.44 |
| 4 | do | 5 | Octadecanol | 0.33 | 0.39 |
| 5 | do | 5 | do | 1 | 0.45 |
| 6 | do | 5 | Oleyl alcohol | 1 | 0.37 |
| 7 | do | 5 | do | 0.5 | 0.37 |
| 8 | do | 5 | do | 0.3 | 0.38 |
| 9 | do | 5 | Iso-stearyl alcohol | 0.5 | 0.38 |
| 10 | None | | Olyl alcohol | 1.0 | 3.1 |
| 11 | Hydrated sodium borate | 5 | None | | 0.38–0.40 |

The above table illustrates the superiority of the unsaturated oleyl alcohol having a scar diameter below 0.38 over the unsaturated amines having a scar diameter of 1 and 0.5.

In addition, as is shown above, the absence of the sodium borate from the test lubricant resulted in very poor extreme pressure properties. This is illustrated by the 9- to 10-fold increase in scar diameter resulting from its removal.

EXAMPLE 4

This example is presented to illustrate the limited slip properties of the lubricants of this invention. In this example, the static to dynamic friction ratio of the test lubricants is measured. This ratio is indicative of the limited slip activity with a ratio below 1 being desired. The ratio is calculated for each test lubricant by measuring the coefficient of friction at static conditions (0.05 r.p.m.) and under dynamic conditions at 2.5 r.p.m. The measurements are taken at room temperature. The ratio of the coefficient of friction at static conditions to the coefficient of friction under dynamic conditions is the friction ratio.

The following table presents the friction ratios for the various lubricants tested in Example 3. The results from these tests are reported in the following Table III.

TABLE III.—LIMITED SLIP ACTIVITY TEST

| | | Test additives | | |
|---|---|---|---|---|
| Test lubricant | Type | Conc. (wt. percent) | Type | Conc. (wt. percent) | Friction ratio |
| 1 | Hydrated sodium borate | 5 | Iso-oleyl amine | 1 | 1.12 |
| 2 | do | 5 | Ethoxylated oleylamine | 1 | 0.92 |
| 3 | do | 5 | Cetyl alcohol | 0.5 | 0.79 |
| 4 | do | 5 | Octadecanol | 0.33 | 0.84 |
| 5 | do | 5 | do | 1 | 0.78 |
| 6 | do | 5 | Oleyl alcohol | 1 | 0.84 |
| 7 | do | 5 | do | 0.5 | 0.87 |
| 8 | do | 5 | do | 0.3 | 1.0 |
| 9 | do | 5 | Iso-stearyl alcohol | 0.5 | 0.95 |
| 10 | None | | Oleyl alcohol | 1.0 | 1.03 |

EXAMPLE 5

This example is presented to illustrate the combined properties of limited slip effectiveness and anti-chatter. This test is a General Motors Limited Slip Test R-4A1-4 often referred to as the big wheel-little wheel test. This test is an actual road test in which one of the rear wheels of the car equipped with a limited slip axle is slightly larger than the other. The test is conducted until the rear axle fails. Failure, as defined herein, means the happening of any one of the following events (1) chattering of the axle in tight turns and (2) losing effectiveness—effectiveness is measured by the ability of the vehicle to drive over a 2" x 4" board placed in front of one of the forward wheels when one of the rear wheels is placed on a free-moving belt or slick spot. The test lubricants are prepared in the same manner as described in Example 3 with various test additives. The results of this test with the various test lubricants are reported in Table IV.

TABLE IV.—BIG WHEEL-LITTLE WHEEL TEST

| | | Test additives | | |
|---|---|---|---|---|
| Test lubricant | Type | Conc. (wt. percent) | Type | Conc. (wt. percent) | Miles to fail | Failure due to— |
| 1 | Hydrated sodium borate | 5 | None | | 150 | Chatter. |
| 2 | do | 5 | Octadecanol | 0.5 | 2,511 | Effectiveness. |
| 3 | do | 5 | do | 0.25 | 357 | Chatter. |
| 4 | do | 5 | Oleyl alcohol | 0.5 | >8,000 | |

The above table dramatically illustrates the increase in limited slip activity, especially anti-chatter, by two fatty alcohols. It also demonstrates that, in this particular test, oleyl alcohol is preferred over octadecanol because, even though both has anti-chatter, since oleyl alcohol maintains effectiveness for a longer period.

What is claimed is:

1. A composition comprising an oil of lubricating viscosity having dispersed therein from 1 to 60 weight percent based on the weight of the composition of particulate hydrated alkali metal borate and from 0.3 to 2 weight percent of a $C_{16}$ to $C_{20}$ aliphatic hydrocarbon alcohol.

2. The composition defined in Claim 1 wherein said particulate hydrated alkali metal borate is dispersed in said oil with at least one lipophilic surface active agent.

3. The composition defined in Claim 2 wherein said liphophilic surface active is a lipophilic anionic surface active agent.

4. The composition defined in Claim 1 wherein said particulate hydrated alkali metal borate is dispersed in acid oil with a dispersant mixture consisting of 40 to 99.9 weight percent of a lipophilic anionic surface active agent and 0.1 to 60 weight percent of a lipophilic nonionic surface active agent.

5. The composition defined in Claim 4 wherein said anionic lipophilic surface active agent is an alkaline earth metal petroleum sulfonate and wherein said nonionic surface active agent is an N-substituted alkenyl succinimide.

6. The lubricant composition defined in Claim 5 wherein said aliphatic hydrocarbon alcohol is selected from the group consisting of octadecanol, palmityl alcohol, oleyl alcohol, and linoleyl alcohol.

7. The composition defined in Claim 6 wherein said alcohol is oleyl alcohol.

8. The composition of Claim 3 wherein said lipophilic anionic surface-active agent is a Group II metal salt of an oil-soluble sulfur-containing carbocyclic compound.

9. The composition of Claim 4 wherein said lipophilic nonionic surface-active agent is an N-substituted alkenyl succinimide or the reaction product of pentaerythritol, polyolefin, and phosphorus sulfide.

10. The composition of Claim 2 wherein said hydrated alkali metal borate is a hydrated sodium borate.

11. The composition of Claim 2 comprising (a) 10 to 100 parts by weight of a nonpolar oil of lubricating viscosity; (b) 2 to 25 parts by weight of amorphous particles of less than 1 micron in diameter of a hydrated sodium borate of the formula $$xNa_2O \cdot B_2O_3 \cdot yH_2O$$

wherein $x$ is a number of from 0.25 to 1.5 and $y$ is a number of 0.01 to 5.0; (c) a lipophilic surface active agent in an amount of about 0.05 to 0.5 part by weight per part by weight of said borate; and (d) in an amount of about 0.05 to 0.75 part by weight per part of said borate of a $C_{12}$-$C_{20}$ monohydroxy aliphatic hydrocarbon alcohol.

12. The composition of Claim 11 wherein said alcohol is an ethylenically unsaturated alcohol having from 1 to 5 olefinic double bonds.

13. The composition of Claim 11 wherein $x$ is a number of from 0.5 to 1.5.

14. The composition of Claim 13 wherein the anhydrous portion of said borate has the formula $$Na_2O \cdot B_2O_3.$$

15. The composition of Claim 11 wherein $y$ is a number of from 0.5 to 5.0.

16. The composition of Claim 15 wherein $y$ is a number (1.0–3.0)$x$, and $x$ is a number of from 0.5 to 1.5.

17. The composition of Claim 11 wherein said alcohol is oleyl alcohol.

References Cited
UNITED STATES PATENTS

| | | | |
|---|---|---|---|
| 3,313,727 | 4/1967 | Peeler | 252—18 |
| 2,409,726 | 10/1946 | Winning et al. | 252—52.R |
| 3,281,359 | 10/1966 | Oberender et al. | 252—46.6 |
| 3,364,185 | 1/1968 | Hoke | 252—46.6 X |
| 3,272,743 | 9/1966 | Norman et al. | 252—33.4 X |
| 3,389,088 | 6/1968 | Schar et al. | 252—52.RX |
| 3,679,585 | 7/1972 | Brook et al. | 252—52.RX |

PATRICK P. GARVIN, Primary Examiner

A. H. METZ, Assistant Examiner

U.S. Cl. X.R.

252—25, 33.4, 74, 75